United States Patent
Beichl

(10) Patent No.: US 8,376,367 B2
(45) Date of Patent: Feb. 19, 2013

(54) BRUSH SEAL AND METHOD FOR MOUNTING A BRUSH SEAL

(75) Inventor: Stefan Beichl, Herrsching (DE)

(73) Assignee: MTU Aero Engines GmbH, Munich (DE)

( * ) Notice: Subject to any disclaimer, the term of this patent is extended or adjusted under 35 U.S.C. 154(b) by 100 days.

(21) Appl. No.: 12/865,081

(22) PCT Filed: Jan. 20, 2009

(86) PCT No.: PCT/DE2009/000060
§ 371 (c)(1),
(2), (4) Date: Jul. 28, 2010

(87) PCT Pub. No.: WO2009/094982
PCT Pub. Date: Aug. 6, 2009

(65) Prior Publication Data
US 2011/0018204 A1    Jan. 27, 2011

(30) Foreign Application Priority Data
Jan. 29, 2008    (DE) .......................... 10 2008 006 486

(51) Int. Cl.
*F16J 15/44*    (2006.01)
(52) U.S. Cl. ....................................... 277/355
(58) Field of Classification Search ................... 277/355
See application file for complete search history.

(56) References Cited

U.S. PATENT DOCUMENTS

| | | | |
|---|---|---|---|
| 5,568,931 A | 10/1996 | Tseng et al. | |
| 6,302,400 B1 * | 10/2001 | Werner et al. | 277/355 |
| 6,695,314 B1 * | 2/2004 | Gail et al. | 277/355 |
| 7,290,769 B2 * | 11/2007 | Plona et al. | 277/355 |
| 7,644,928 B2 * | 1/2010 | Beichl et al. | 277/355 |
| 2004/0256807 A1 | 12/2004 | Bhate et al. | |
| 2005/0040602 A1 * | 2/2005 | Beichl et al. | 277/355 |
| 2005/0151324 A1 * | 7/2005 | Plona et al. | 277/355 |
| 2007/0132189 A1 | 6/2007 | Short et al. | |
| 2010/0068042 A1 * | 3/2010 | Bruck et al. | 415/174.2 |

FOREIGN PATENT DOCUMENTS

| | | |
|---|---|---|
| EP | 1 146 266 A2 | 10/2001 |
| EP | 1 510 655 A1 | 3/2005 |
| FR | 2 731 490 A1 | 9/1996 |
| WO | WO 92/05378 | 4/1992 |

OTHER PUBLICATIONS

PCT/DE2009/000060 PCT/ISA/210.
U.S. Patent Application, filed Jul. 28, 2010, inventor Stefan Beichl.

* cited by examiner

*Primary Examiner* — Gilbert Lee
(74) *Attorney, Agent, or Firm* — Crowell & Moring LLP

(57) ABSTRACT

A brush seal and a method for mounting a brush seal is disclosed. The brush seal includes a sealing element provided with a plurality of filaments or wires that are joined at a filament or wire end to form a filament or wire bundle and a clamp-like sealing housing for receiving and fixing the filament or wire end between a first and a second limb and for fixing the brush seal in a mounting recess of a housing. A free end of the filament or wire bundle of the sealing element is clamped between a partial area of an inner contour of the second limb that is adjacent to a region of an outlet opening of the mounting recess of the housing and an area of the outlet opening that is opposite from the partial area.

11 Claims, 1 Drawing Sheet

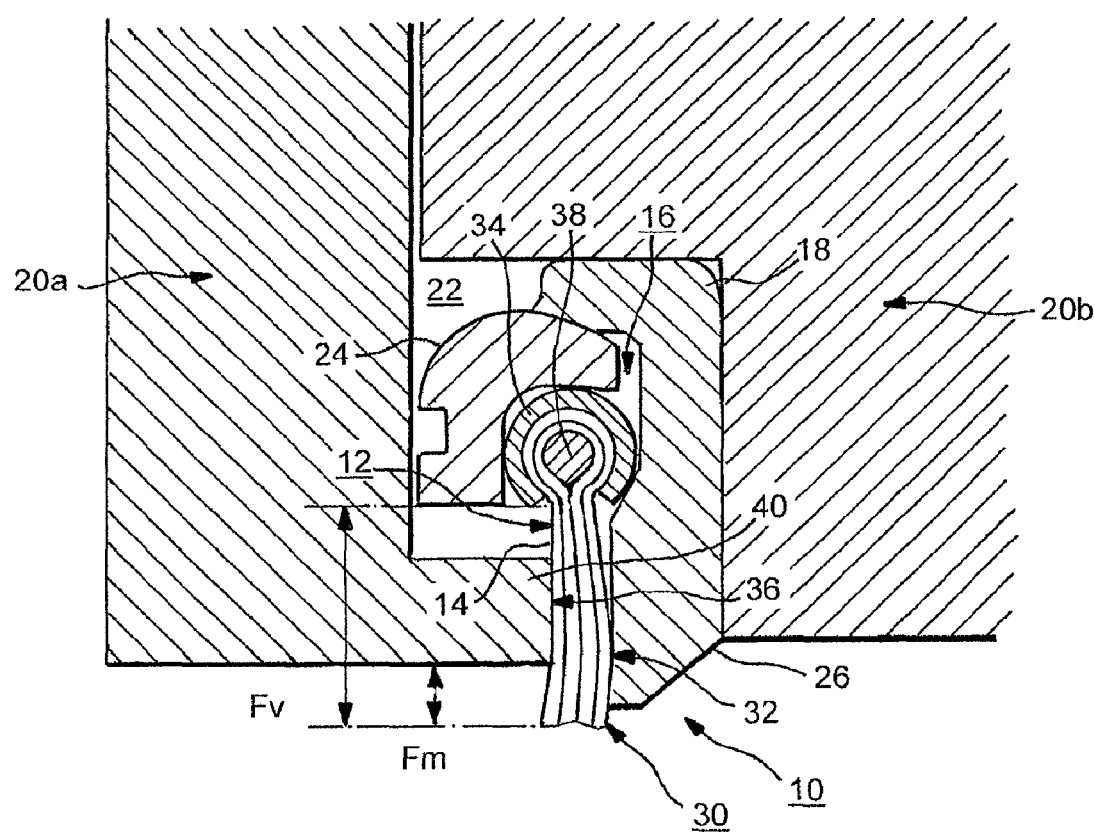

BRUSH SEAL AND METHOD FOR MOUNTING A BRUSH SEAL

This application claims the priority of International Application No. PCT/DE2009/000060, filed Jan. 20, 2009, and German Patent Document No. 10 2008 006 486.6, filed Jan. 29, 2008, the disclosures of which are expressly incorporated by reference herein.

BACKGROUND AND SUMMARY OF THE INVENTION

The present invention relates to a brush seal comprising a sealing element provided with a plurality of filaments or wires that are joined at a filament or wire end to form a filament or wire bundle and a clamp-like sealing housing for receiving and fixing the filament or wire end between a first and a second limb and for fixing the brush seal in a mounting recess of a housing. The invention also relates to a method for mounting a brush seal.

A great variety of brush seals of the type cited at the outset are known and are used—for example in gas turbines, to seal the intermediate space between a housing and a rotor, rotating at a relatively high speed, against leaks. A corresponding brush seal is described—for example in U.S. Patent Application Publication No. 2007/0132189 A1. The disadvantage of known brush seals, however, is that the basic rigidity of the brush seal required for the respective intended use must be adjusted with appropriate measures prior to mounting the brush seal in the respective machine. Thus, until now brush seals were built with a permanently-fixed free filament length. In this case, the free filament length is understood to be the section of the filament or wire bundle that is not surrounded by a clamping element, welding area, or adhesion area for fixing and bundling the individual filaments and wires. Thus, it was discovered, for example, when using Kevlar® brush seals in machine tool rotating unions, that the required leak tightness could only be achieved with very short filament lengths. In the process, it was observed that an unacceptably high heat build-up may occur. In order to limit this build-up of heat, the brush seal in this cited example is paired with the shaft in order to achieve the required basic stiffness of the brush seal. This approach is not economical and hard to control logistically. As a result, the objective of the present invention is making available a generic brush seal whose basic stiffness is adjustable.

A further objective of the present invention is providing a method for mounting a brush seal, which makes it possible to adjust and adapt the basic stiffness of the brush seal to the individual requirements of the environment being sealed.

A brush seal according to the invention has a sealing element provided with a plurality of filaments and wires, wherein the filaments and wires are joined at a filament or wire end to form a filament or wire bundle. In addition, the sealing element has a clamp-like sealing housing for receiving and fixing the filament or wire end between a first and a second limb and for fixing the brush seal in a mounting recess of a housing. The sealing housing is designed in such a manner that the first limb is configured to be shorter than the second limb, wherein the second limb rests, by means of its outer contour, against an inner side of the mounting recess, and at least one partial area of the inner contour of the second limb is adjacent, in the region of an outlet opening for a free area of the filament or wire bundle that protrudes from the housing and that is opposite from the filament or wire end, to the free end, and is adjacent to an area of the free end of the filament or wire bundle that is opposite from the partial area at least partially at the outlet opening. In addition, the first limb rests against an inner side of the mounting recess. In the case of the brush seal according to the invention, the basic stiffness of the filament or wire bundle or the seal is not adjusted until after mounting or until the time the brush seal is mounted in the housing. In the process, the filaments or wires are clamped between the second limb of the sealing housing and the outlet opening of the mounting recess. The length of the second limb of the sealing housing may be varied so that the free filament length and thus the basic stiffness of the brush seal may be adapted individually to the requirements of the environment being sealed. In addition, the brush seal may be fabricated with normal fabrication tolerances, because any applicable very high basic stiffness of the brush seal is achieved after mounting the brush seal. As a result, the leak tightness as well as the heat build-up may be adjusted, for example, during operation without the brush seal having to be paired with a shaft. The costs of manufacturing and mounting as well as logistical time and effort are thereby reduced considerably. Thus, the brush seal can be fabricated with long filaments that have a low basic stiffness. When the brush seal is mounted, the filaments or wires are clamped in a predetermined area by the sealing housing and the outlet opening of the mounting recess in such a way that the clamped filaments or wires function in a manner analogous to a brush seal having shorter filaments.

In an advantageous embodiment of the brush seal according to the invention, the filament or wire end is fabricated of a core wire, around which the plurality of filaments or wires is wound and a clamping element, in particular a clamping tube, wherein the clamping element is used for fixing and bundling the filaments and wires. However, it is also possible for the filament or wire end to have a welding or adhesion area for fixing and bundling the filaments and wires. According to the invention, different types of sealing elements may be used.

In other advantageous embodiments of the brush seal according to the invention, the sealing housing is configured to be one-piece or the first and second limbs of the sealing housing are configured as separate structural elements. In this case, the sealing housing may be made of metal, a meal alloy, plastic or ceramic. The sealing housing may be adapted advantageously to the respective requirements of the areas of the machine being sealed.

In other advantageous embodiments of the brush seal according to the invention, the second limb of the sealing housing is configured in such a manner that it projects out of the outlet opening of the mounting recess. As a result, very high levels of basic stiffness of the brush seal may be achieved advantageously. In addition, the partial area with which the second limb is adjacent to the filament or wire bundle of the brush seal may be configured to be spaced apart from the free end of the filament or wire bundle. This makes it possible to advantageously avoid undesired contact between the sealing housing and/or the second limb and opposing machine parts.

According to other advantageous embodiments of the brush seal according to the invention, the housing in which the brush seal is mounted may be a structural element of an aircraft or stationary gas turbine, a compressor, a steam turbine or a machine tool. Basically, the brush seal may be used in all machines in which a gap between two structural elements of the machine must be sealed.

A method for mounting a brush seal in a housing according to the invention includes the following steps: a) Making available a brush seal comprising a sealing element provided with a plurality of filaments or wires that are joined at a filament or wire end to form a filament or wire bundle and a clamp-like sealing housing for receiving and fixing the filament or wire end between a first and a second limb, wherein the sealing housing is designed in such a manner that the first limb is configured to be shorter than second limb and b) Inserting and fixing the brush seal in a mounting recess of the housing, wherein the second limb rests, by means of its outer contour, against an inner side of the mounting recess, and at least one partial area of the inner contour of the second limb is adjacent, in the region of an outlet opening for a free end of the filament or wire bundle that protrudes from the housing and that is opposite from the filament or wire end, to the free end, and is adjacent to an area of the free end of the filament or wire bundle that is opposite from the partial area at least partially at the outlet opening, and the first limb rests against an inner side of the mounting recess. In the case of the method according to the invention, the basic stiffness of the filament or wire bundle or the seal is not adjusted until after mounting or until the time the brush seal is mounted in the housing. In the process, the filaments or wires are clamped between the second limb of the sealing housing and the outlet opening of the mounting recess. The length of the second limb of the sealing housing may be varied so that the free filament length and thus the basic stiffness of the brush seal may be adapted individually to the requirements of the environment being sealed.

Other advantages, features and details of the invention are disclosed in the subsequent description of an exemplary embodiment that is depicted graphically.

BRIEF DESCRIPTION OF THE DRAWING

The FIGURE shows a schematic sectional representation of a brush seal 10.

DETAILED DESCRIPTION OF THE DRAWING

The brush seal 10 is made of a sealing element 12, wherein the sealing element 12 includes a plurality of filaments or wires, which are joined at a filament or wire end 16 to form a filament or wire bundle 14. In addition, the sealing element 12 has a clamp-like sealing housing 18 for receiving and fixing the filament or wire end 16 between a first and a second limb 24, 26. The sealing housing 18 is also used for fixing the brush seal 10 in a mounting recess 22 of a housing 20a, 20b that is designed as two parts. In this case, the filaments or wires are made of metal, a metal alloy, plastic or ceramic.

In addition, one can see that the sealing housing 18 is designed in such a manner that the first limb 24 is shorter than the second limb 26, wherein the second limb 26 rests with its outer contour at least partially against an inner side of the mounting recess 22. A partial area 32 of the inner contour of the second limb 26 is adjacent to the filament or wire bundle 14 in the region of an outlet opening 28 of the mounting recess 22. The outlet opening 28 in this case is used for the exit of a free end 30 of the filament or wire bundle 14 that protrudes from the housing 20a, 20b and that is opposite from the filament or wire end 16. An area 36 of the free end 30 of the filament or wire bundle 14 that is opposite from the partial area 32 is adjacent to the outlet opening 28. As a result, a clamping effect is produced between the partial area 32 of the second limb 26 and the area of the outlet opening 28, and the clamping effect produces a shortening of the free filament length of the filament or wire bundle 14. Because of the change in the free filament length, the basic stiffness is modified. In the present exemplary embodiment the basic stiffness of the brush seal 10 is increased due to the shortening of the free filament length. It becomes clear in the process that the brush seal 10 has a free filament length Fv prior to mounting in the housing 20a, 20b, which is greater than the free filament length Fm after the brush seal has been mounted. To achieve the clamping effect, the sealing housing 18 is inserted with the fixed sealing element 12 into the mounting recess 22 of the housing part 20b. Subsequently, the second housing part 20a is connected to the first housing part 20b, wherein a projection 40 of the second housing part 20a is pressed against the area 36 of the free end 30 of the filament or wire bundle 14.

In addition, it is evident that the filament or wire end 16 is made of a core wire 38, around which a plurality of filaments or wires is wound, and a clamping element 34, wherein the clamping element 34 is used for fixing and bundling the filaments and wires. The clamping element 34 in the depicted exemplary embodiment is embodied as a clamping tube. The sealing housing 18 in the depicted exemplary embodiment is configured to be one-piece. However, it is also possible for the first and second limbs 24, 26 of the sealing housing 18 to be configured as separate structural elements. The sealing housing 18 may be made of metal, a metal alloy, plastic or ceramic.

In the depicted exemplary embodiment, the second limb 26 of the sealing housing 18 is configured in such a manner that it projects out of the outlet opening 28. However, it is also possible for the second limb 26 to terminate flush with the outlet opening 28. In addition, one can see that the partial area 32 of the second limb 26 is configured to be spaced apart from the free end 30 of the filament or wire bundle 14.

The invention claimed is:

1. A brush seal, comprising:
   a housing including a mounting recess with an outlet opening;
   a sealing element including a plurality of filaments or wires that are joined at a filament or wire end to form a filament or wire bundle, wherein a free end of the filament or wire bundle that is opposite from the filament or wire end protrudes from the housing through the outlet opening; and
   a sealing housing disposed at least partially within the mounting recess and including a first limb and a second limb, wherein the filament or wire end is fixed between the first limb and the second limb;
   wherein the first limb is shorter than the second limb, wherein an outer contour of the second limb rests against an inner side of the mounting recess, and wherein the first limb rests against the inner side of the mounting recess;
   wherein a partial area of an inner contour of the second limb is adjacent to the filament or wire bundle in a region of the outlet opening of the mounting recess;
   and wherein an area of the free end of the filament or wire bundle of the sealing element is clamped between the partial area of the inner contour of the second limb that is adjacent to the region of the outlet opening of the mounting recess and an area of the outlet opening that is opposite from the partial area.

2. The brush seal according to claim 1, wherein the filament or wire end includes a core wire around which the plurality of filaments or wires is wound and a clamping element, wherein the clamping element fixes and bundles the filaments or wires.

3. The brush seal according to claim 1, wherein the filament or wire end has a welding area or adhesion area for fixing and bundling the filaments or wires.

4. The brush seal according to claim 1, wherein the sealing housing is configured to be one-piece.

5. The brush seal according to claim 1, wherein the first and second limbs of the sealing housing are configured as separate structural elements.

6. The brush seal according to claim 1, wherein the sealing housing is made of metal, a metal alloy, plastic or ceramic.

7. The brush seal according to claim 1, wherein the second limb projects out of the outlet opening.

8. The brush seal according to claim 1, wherein the partial area is spaced apart from the free end of the filament or wire bundle.

9. The brush seal according to claim 1, wherein the housing is a structural element of an aircraft or stationary gas turbine, a compressor, a steam turbine or a machine tool.

10. A method for mounting a sealing element in a housing, comprising the steps of:
   fixing a filament or wire end of a filament or wire bundle of a sealing element between a first limb and a second limb of a sealing housing, wherein the first limb is shorter than second limb;
   inserting the sealing housing with the sealing element in a mounting recess of a housing; and
   clamping an area of a free end of the filament or wire bundle of the sealing element between a partial area of an inner contour of the second limb that is adjacent to a region of an outlet opening of the mounting recess and an area of the outlet opening that is opposite from the partial area.

11. A brush seal, comprising:
   a housing including a mounting recess with an outlet opening;
   a sealing element including a plurality of filaments or wires that are joined at a filament or wire end to form a filament or wire bundle, wherein a free end of the filament or wire bundle that is opposite from the filament or wire end protrudes from the housing through the outlet opening; and
   a sealing housing disposed at least partially within the mounting recess and including a first limb and a second limb, wherein the filament or wire end is fixed between the first limb and the second limb;
   wherein the first limb is shorter than the second limb, wherein an outer contour of the second limb rests against an inner side of the mounting recess, and wherein the first limb rests against the inner side of the mounting recess;
   and wherein an area of the free end of the filament or wire bundle of the sealing element is clamped between a partial area of an inner contour of the second limb that is adjacent to a region of the outlet opening of the mounting recess and an area of the outlet opening that is opposite from the partial area.

* * * * *